Dec. 7, 1926.                M. M. HARRISON                1,610,088
                              AMPLIFYING HORN
                             Filed Sept. 2, 1924

Inventor:
Marion M. Harrison,
by Spear Middleton Donaldson & Hall
                                Attys.

Patented Dec. 7, 1926.

1,610,088

UNITED STATES PATENT OFFICE.

MARION M. HARRISON, OF AKRON, OHIO, ASSIGNOR TO THE MILLER RUBBER COMPANY, OF AKRON, OHIO, A CORPORATION OF OHIO.

AMPLIFYING HORN.

Application filed September 2, 1924. Serial No. 735,364.

The invention consists of an amplifying horn having a layer of hard rubber providing the main supporting part and a layer of soft rubber on the inner side of the same, or the soft rubber may be in a layer on the outer side of the horn as well as on the inner side.

In the drawing—

Figure 1:
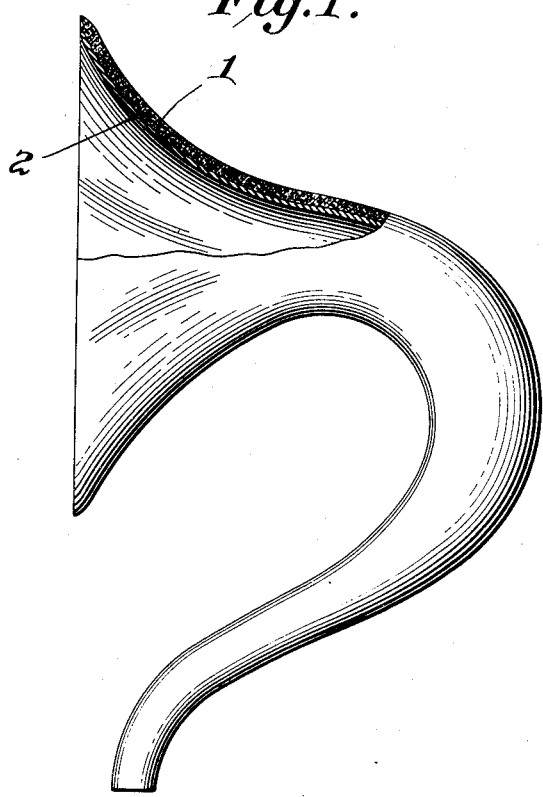
Figure 1 is a side elevation of a horn partly in section.

In the drawing, 1 indicates a layer of rigid hard rubber and 2 the inner layer of soft vulcanized rubber. The two compounds are built up on a core in the usual way and vulcanized, the two compounds being vulcanized simultaneously and uniting with each other. If the horn is subjected to shock or jar sufficient to rupture the hard rubber layer, the soft vulcanized layer will not break through but will remain intact holding the parts of the broken hard rubber layer in substantially normal position and the soft rubber layer will function as intended.

Figure 2:
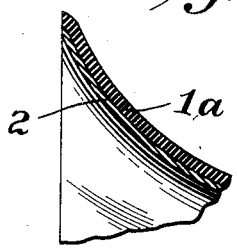
Fig. 2 is a sectional view of a portion of a horn illustrating a modification.

The hard rubber vulcanized layer may be of cellular form, as shown in Fig. 1 or it may be of solid nature as indicated at $1^a$ in Fig. 2.

The soft rubber coating will dampen vibrations which may be set up in the hard rubber layer.

I claim:

1. A sound amplifying horn comprising a body portion of hard rubber having a smooth integral lining of solid soft rubber rigidly united thereto serving to dampen vibration set up in the hard rubber.

2. The article of claim 1, in which the hard rubber is of a cellular nature.

In testimony whereof, I affix my signature.

MARION M. HARRISON.